No. 840,791. PATENTED JAN. 8, 1907.
H. MÖHRING.
SPRING WASHER.
APPLICATION FILED NOV. 14, 1905.

Witnesses:

Inventor:
Hermann Möhring
By Richards &c,
attys.

UNITED STATES PATENT OFFICE.

HERMANN MÖHRING, OF ST. PETERSBURG, RUSSIA, ASSIGNOR TO COMMERCIAL FIRM "CARL SPIEGEL," OF ST. PETERSBURG, RUSSIA.

SPRING-WASHER.

No. 840,791. Specification of Letters Patent. Patented Jan. 8, 1907.

Application filed November 14, 1905. Serial No. 287,278.

To all whom it may concern:

Be it known that I, HERMANN MÖHRING, a subject of the German Emperor, and a resident of St. Petersburg, Russia, Ninth Rojdestvenskaya street, 3, have invented certain new and useful Improvements in Spring-Washers, of which the following is a specification.

My invention relates to elastic or spring washers chiefly adapted for use with bolts for securing fish-plates to railway-rails.

According to this invention the improved washer is made from a circular disk of metal—say steel—having a central hole, the metal around the hole being turned up or dished and that around the disk being bent upwardly and inwardly, so that in cross-section the shape somewhat resembles a C.

Figure 1:
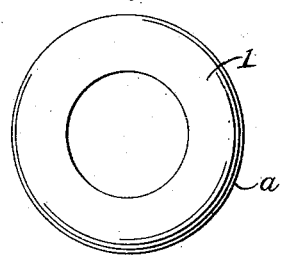
Figure 2:
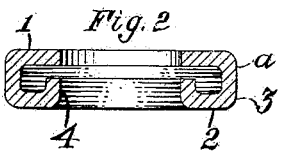

In the accompanying drawings, Figure 1 represents a plan view of the washer, and Fig. 2 a cross-section thereof.

The washer $a$ is formed from a circular piece of metal having a central recess. The said piece of metal is pressed into the proper form by suitable dies, and the finished washer consists of the top and bottom annular portions 1 and 2, joined together at their outer edges by the vertical portion 3. The inner edge of the bottom portion 2 is bent upwardly into the space between the top and bottom portions to form a flange 4.

The action of my improved washer is as follows: When a nut is tightened, the inner edges of the washer are approached toward one another until the projecting flange 4 of the lower part comes into contact with the upper part. The washer, however, retains its elasticity, thus insuring rigid bolting and also preventing the accidental loosening of the nut by the considerable friction which exists between the washer and the nut.

I claim as my invention—

A washer consisting of the parallel annular portions each having a central recess, an outer vertical portion connecting the parallel portions together and an upwardly-extending flange on the inner edge of the lower parallel portion.

In testimony whereof I have signed my name to this specification in the presence of two subscribing witnesses.

HERMANN MÖHRING.

Witnesses:
H. A. LOVIAGUINE,
N. TSCHEKALOFF.